United States Patent [19]

Brock

[11] 4,348,146
[45] Sep. 7, 1982

[54] SELF-ERECTING SURGE BIN

[75] Inventor: J. Donald Brock, Chattanooga, TN

[73] Assignee: Astec Industries, Inc., Chattanooga, Tenn.

[21] Appl. No.: 148,509

[22] Filed: May 9, 1980

Related U.S. Application Data

[62] Division of Ser. No. 912,501, Jun. 5, 1978, Pat. No. 4,249,351.

[51] Int. Cl.³ .................................................. B65G 67/08
[52] U.S. Cl. ........................................ 414/332; 414/919
[58] Field of Search .................... 414/332, 919, 29.3, 414/29.9; 52/64, 143, 194, 197; 222/160; 198/532

[56]        References Cited
U.S. PATENT DOCUMENTS

| | | | |
|---|---|---|---|
| 3,154,202 | 10/1964 | Heltzel | 414/332 |
| 3,228,151 | 1/1966 | Woolslayer | 52/64 |
| 3,315,929 | 4/1967 | Keiser | 52/143 |
| 3,348,572 | 10/1967 | Hall | 222/160 |
| 3,586,181 | 6/1971 | Brock | 414/332 |
| 4,111,314 | 9/1978 | Nelson | 52/194 |

Primary Examiner—Robert R. Song
Attorney, Agent, or Firm—Jones & Askew

[57] ABSTRACT

Self-erecting apparatus for transporting and temporarily storing material such as asphalt; the apparatus includes a surge bin and a drag chute for transporting the asphalt material from a drum plant to the surge bin. The drag chute and the surge bin are pivotally attached to each other and to a flat bed trailer, permitting their simultaneous raising and lowering by means of a winch apparatus attached by means of cables to the support legs of the surge bin to provide ease of lowering the bin for transportation of the apparatus from one site to another and ease in erecting the bin at a new site. A foldable side panel of the surge bin permits the drag chute to nest in the surge bin thus providing a more compact arrangement of the apparatus when in the lowered configuration.

5 Claims, 3 Drawing Figures

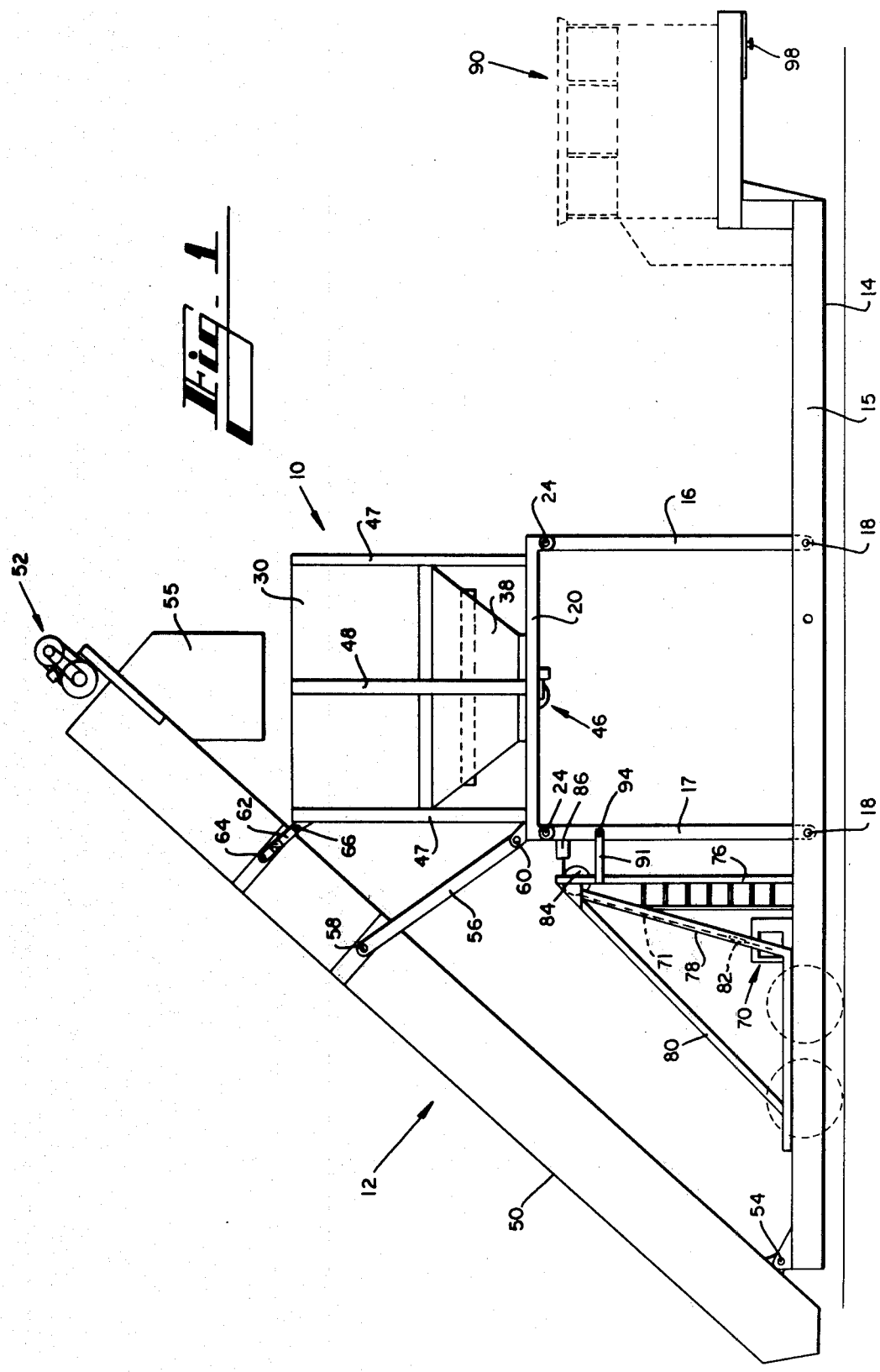

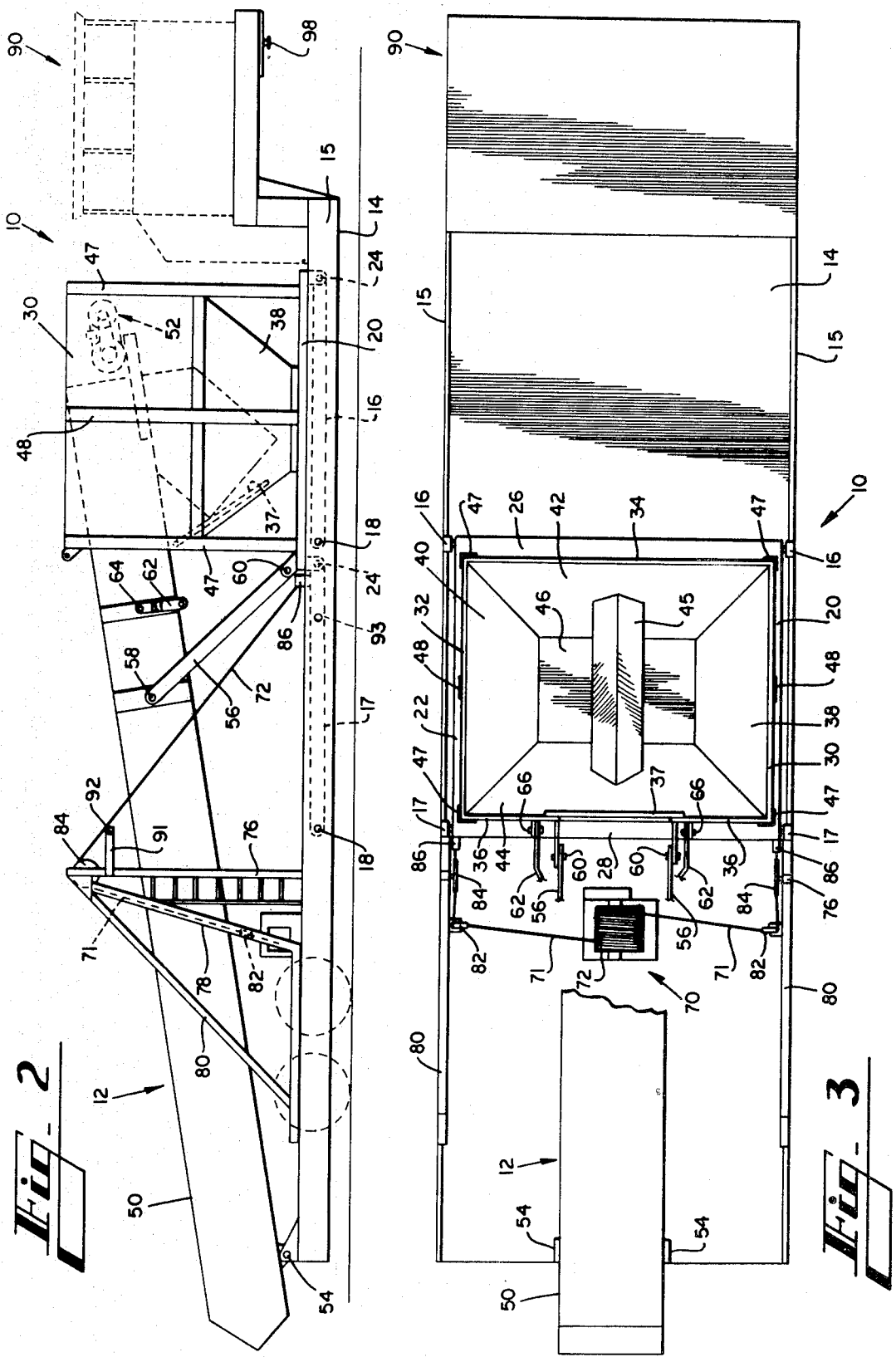

SELF-ERECTING SURGE BIN

This application is a division of application Ser. No. 912,501, filed June 5, 1978, now U.S. Pat. No. 4,249,351, issued Feb. 10, 1981.

The present invention relates to surge bins for storage of material and, more particularly, to surge bins for storing mixed asphalt material.

The term surge bin is used in the asphalt industry to designate a bin used for the temporary storage of asphalt between the time it is produced and the time the asphalt is loaded on a truck for transportation to a work site. The surge bin is usually mounted on legs to elevate the bin to a height which permits a truck to be driven underneath the surge bin. A gate in the bottom of the surge bin is then opened and the asphalt material falls out of the bin into the truck below.

It has been found that it is often desirable to be able to conveniently move an asphalt plant, including a surge bin, from one site to another. Therefore, the surge bin apparatus has often been mounted on a trailer. However, in order to permit the trailer to pass underneath bridges and to provide less wind resistance and greater stability of the trailer while being transported, it is desirable to reduce the overall height of the surge bin assembly. In some prior art systems, this has been done by disassembling the surge bin apparatus using a crane. However, this requires much time and inconvenience. Surge bins have also been mounted on jack screws or hydraulic jacks to either raise or lower the surge bin vertically.

SUMMARY OF THE INVENTION

Generally described, the present invention comprises a collapsable bin apparatus pivotally mounted above a frame on a plurality of legs, and a means for lowering the bin onto the frame by pivotal motion of the bin and the legs with respect to one another and to the frame. The bin may thus be conveniently and quickly lowered to a position on the frame horizontally displaced from its raised position, and similarly raised to an operating position when desired. A winch may be used to raise the bin and to gradually lower the bin under the force of gravity.

In another embodiment the apparatus includes a drag chute and a surge bin pivotally attached to the trailer and to each other. A side panel of the surge bin folds inwardly permitting the drag chute to nest in the surge bin, thus giving the apparatus a low overall profile when in the lowered configuration. A winch attached to the surge bin by cables permits quick and easy raising and lowering of the entire apparatus.

Accordingly, it is an object of the present invention to provide an improved surge bin apparatus.

Another object of the present invention is to provide an improved self-erecting surge bin apparatus which may be conveniently raised for use and lowered for transportation from site to site.

A further object of the present invention is to provide a self-erecting surge bin apparatus which has a low profile when in the lowered configuration.

Yet another object of the present invention is to provide a self-erecting surge bin apparatus which may be easily transported from one site to another.

Still another object of the present invention is to provide a self-erecting surge bin apparatus which may be quickly and easily changed from the raised configuration to the lowered configuration and vice versa.

These and other objects, features and advantages will become apparent from a review of the following detailed description of the invention and the appended drawing and claims.

BRIEF DESCRIPTION OF THE DRAWING

FIG. 1 is a side view of a disclosed embodiment of the self-erecting apparatus of the present invention shown in the raised position.

FIG. 2 is a side view of the self-erecting apparatus shown in FIG. 1, showing said apparatus in the lowered position.

FIG. 3 is a top view of the self-erecting apparatus shown in FIG. 1, with the drag chute broken away to expose the winch mechanism.

DETAILED DESCRIPTION OF THE DISCLOSED EMBODIMENT

Referring now to the drawing in which like numbers indicate like elements, it will be seen that there is a surge bin 10 and a drag chute 12 mounted on a flat bed trailer 14 which includes side beams 15 extending above the flat bed or platform of the trailer 14. In the raised position (best shown in FIG. 1), the surge bin 10 stands on a pair of front support legs 16 and a pair of rear support legs 17 each of which is attached at its lower end to a side beam 15 of the trailer 14 by pivot pins 18. The pivot pins 18 permit the support legs 16 and 17 to fold forward into a position parallel to the bed of the trailer 14. The upper ends of the supports leg 16 and 17 are pivotally attached to cross braces 20 and 22 by pivot pins 24. The cross braces 20 and 22 are securely attached to each other by two tie braces 26 and 28 shown in FIG. 3. Therefore, although the support legs 16 and 17 are pivotally attached at both ends thereof, the rigidly connected cross braces 20 and 22 and tie braces 26 and 28 prevent the legs from moving independently of each other. The combination of the pivot pins 18 and 24 and the cross and tie braces 20, 22, 26 and 28 provides a rigid yet foldable leg structure.

Disposed on top of this foldable leg structure is the surge bin 10. The surge bin 10 is convertible from a raised configuration, as shown in FIG. 1, to a lowered configuration as shown in FIG. 2, in a manner described in detail hereinafter.

The surge bin 10 is comprised of four side panels 30, 32, 34 and 36 which remain essentially vertical when the surge bin is in both the raised and the lowered configuration. A foldable side panel 37 provides a door in the side panel 36. The foldable side panel 37 may be in a vertical position when the apparatus is in the raised configuration and may be folded into the surge bin when the apparatus is in the lowered configuration, as shown in dotted lines in FIG. 2. The surge bin 10 is further comprised of four bottom panels 38, 40, 42 and 44 attached to the lower end of the side panels 30–36 and inclined from vertical to form a rectangular funnel shape with a rectangular opening at the bottom. A wedged-shaped batch splitter 45 is removably located inside the surge bin 10, and a gate 46, as shown in FIG. 3, covers the rectangular opening in the bottom of the surge bin.

The surge bin 10 is mounted atop the support leg structure by four vertical braces 47 attached at their upper ends to the side panels 30–36 at the corners formed thereby. Two additional braces 48 are also attached at their upper ends to the middle of the side panels 30 and 32. The lower end of each of the braces 47 and 48 is attached to the cross braces 20 and 22. Since the surge bin 10 is firmly attached to the cross braces 20 and 22, the surge bin is always in an upright position with the side panels 30-36 remaining substantially vertical as the legs 16 and 17 are raised and lowered.

Mounted on the rear of the trailer 14 and extending upwardly and forwardly therefrom is a drag chute 12. The drage chute 12 is comprised of a chute enclosure 50 having a drag chain (not shown) therein, as is known to those skilled in the art. The drag chain makes a circuitous path along the length of the interior of the drag chute enclosure 50 from its lower end to its upper end. The drag chain is driven by a motor 52 mounted on the upper end of the drag chute 12.

The lower end of the drag chute 12 is pivotally attached to the rear of the trailer 14 by pivot pins 54. The pivotal attachment of the drag chute 12 permits it to rotate about the pivot 54 through an angle of approximately 30 degrees from a position slightly above horizontal to an angle of approximately 60 degress.

Attached to the upper end of the drag chute 12 is a batcher assembly 55. The batcher assembly 55 extends downwardly from the upper end of the drag chute 12 in a substantially vertical direction when the surge bin 10 is in the raised position, as shown in FIG. 1. In the bottom of the batcher assembly 55 are doors (not shown) which can be opened and closed.

At a point near the mid-point of the length of the drag chute 12, a pair of linkages 56 pivotally attach the drag chute to the support leg structure and the tie brace 28 by means of pivots 58 on the drag chute and pivots 60 extending from the tie brace. The pivotal attachment of the drag chute 12 to the tie brace 28 allows the drag chute to move in unison with the surge bin 10 as it is raised and lowered.

When the surge bin 10 is in the raised configuration, a second linkage 62 attaches the drag chute 12 to the top portion of the side panel 36 by means of pivots 64 on the drag chute and removable locking pins 66 on the side panel. The locking pins 66 are removed to detach the linkage 62 from the surge bin 10 prior to lowering the bin. This second linkage 62 provides increased stability to the drag chute 12 when in the raised position.

The erecting mechanism for raising and lowering the surge bin and drag chute is located on the aft portion of the trailer 14. The mechanism comprises a conventional winch apparatus 70 having a cable 71 wound on a drum 72 with the cable extending from opposite sides of the drum, as shown in FIG. 3. Located on either side of the winch 70 are posts 76 attached to the trailer 14 and having two slant braces 78 and 80 attached thereto to give each post extra strength and rigidity in the direction of the longitudinal axis of the trailer. A pulley 82 is attached to the lower portion of each slant brace 78 and a second pulley 84 is attached to the top portion of each post 76. The cable 71 feeds from the drum 72 through the first pulleys 82, then upwardly and parallel to the slant braces 78, through the second pulleys 84, whereupon the ends of the cable are attached to the support legs 17 by means of pin eye brackets 86 attached thereto. Thus, it will be appreciated that when the cable 71 is reeled into the winch 70, a force is applied to the upper portion of the support legs 17 which will tend to raise them, if in the lowered configuration. Conversely, if the apparatus is in the raised configuration, playing the cable 71 out of the winch 70 will lower the support legs 17 under the weight of the apparatus.

The posts 76 also carry cross bars 91 which extend to a position adjacent the rear legs 17 of the surge bin 10. Mating holes, 92 and 93, are located in the cross bars 91 and the legs 17, respectively. When the surge bin 10 is in the raised position, locking pins 94 fit through the holes 92 and 93 to secure the bin 10 in the raised configuration.

It will be understood by those skilled in the art that other means, such as hydraulic cylinders, may be used to pivotally raise and lower the drag chute and surge bin.

In operation, the apparatus is assumed to be initially in the lowered configuration. The trailer 14 is attached to a conventional cab by a hitch 98 and transported to the desired site. The rear of the trailer is then backed up to an asphalt plant where asphalt material is being produced. An operator in a control house 90, shown in dotted lines in FIG. 1, activates the winch apparatus 70 which then reels in the cable 71. As the cable 71 is reeled in, it raises the surge bin 10 on the support legs 16 and 17. Since the drag chute 12 is also attached to the surge bin 10, as the winch 70 raises the surge bin, it also raises the drag chute.

When the surge bin 10 is in its fully erect position, the legs 17 are secured in the raised position by inserting the pins 94 into the holes 92 and 93 in the cross bars 91 and legs 17. Additionally, the second linkages 62 are attached to the top portion of the side panel 36 by inserting the locking pins 66. When thusly secured, the drag chute 12 and the surge bin 10 are firmly held in the raised position.

Before the surge bin 10 is operational, the foldable side panel 37 is raised and secured in position by bolts (not shown). Additionally, the wedge-shaped batch splitter 45 is attached to the inside of the surge bin 10. Ramps (not shown) may be provided on either side of the trailer 14 so that trucks may be driven up onto the trailer directly under the surge bin 10.

Typically, asphalt material is delivered to the lower end of the drag chute 12 by a conveyor from an asphalt drum mix plant. The asphalt material is then moved from the lower end of the drag chute 12 to the upper end of the drag chute by the drag chain (not shown) which is driven by the motor 52.

When the asphalt material reaches the upper end of the drag chute 12, it falls into the batcher assembly 55 which has its doors (not shown) in the closed position. The doors are held closed until a quantity of asphalt material has collected in the batcher assembly 55. The doors of the batcher assembly 55 are then opened and the asphalt material falls into the surge bin 10 in a "batch" rather than in a continuous stream. This is done to minimize segregation of larger pieces of aggregate material from smaller pieces of the aggregate material in the asphalt mix.

The gate 46 in the bottom of the surge bin 10 is initially closed to permit the batches of asphalt material to collect in the surge bin. A truck is then driven onto the trailer 14 directly under the surge bin 10, the gate 46 of the surge bin is opened, and a load of asphalt material is discharged from the surge bin into the waiting truck.

To further aid in the prevention of segregation of the asphalt material as it is loaded into the truck, the batch splitter 45 in the bottom of the surge bin 10 divides the asphalt material into two streams as it leaves the surge bin.

When the truck is fully loaded, the gate 46 of the surge bin 10 is closed, thus preventing more asphalt material from falling from the surge bin into the truck. The loaded truck may then be driven off the trailer 14 and replaced by an empty truck.

When the surge bin 10 is no longer needed at a particular location, it may be converted into the lowered configuration for more convenient transport. First, the batch splitter 45 is removed from the surge bin 10. The foldable side panel 37 is then unbolted and folded down inside the surge bin 10, the locking pins 66 are disengaged from the second linkages 62, and the pins 94 are then removed from the cross bars 91 and the legs 17. The surge bin 10 may then be lowered by unreeling the cable 71 from the winch 70. As the cable 71 is played out, the weight of the surge bin 10 causes the legs 16 and 17 to fold forward and downward until the surge bin is completely lowered onto the trailer 14.

Since the drag chute 12 is pivotally attached to the tie brace 28 of the surge bin 10 by means of the linkages 56, as the surge bin is lowered, the drag chute will be lowered simultaneously. A particular advantage of the present invention is that the arrangement of the linkages 56 and the foldable side panel 37 permits the upper end of the drag chute 12 and the batcher assembly 55 to nest inside the surge bin 10 when in the lowered position. The nesting feature of the drag chute 12 permits the entire apparatus to assume a lower profile when in the lowered configuration and thus makes the apparatus more stable and easier to transport.

When the surge bin 10 and drag chute 12 have been lowered, a conventional truck tractor may be hitched to the trailer 14 and the entire apparatus may be moved to a different location where it can again be quickly and easily raised to its operating configuration.

It will be understood by those skilled in the art that the apparatus of the present invention may be used to store any material, in addition to asphalt mix, which may be conveyed to and delivered from a surge bin.

It should be understood, of course, that the foregoing relates only to a preferred embodiment of the present invention and that numerous modifications or alterations may be made therein without departing from the spirit and scope of the invention as set forth in the appended claims.

What is claimed is:

1. Apparatus for transporting and temporarily storing asphalt, said apparatus comprising:
    trailer means;
    bin means having a raised and a lowered configuration with respect to said trailer means, said bin means being pivotally attached to said trailer means and including a plurality of connected wall sections defining a storage bin area open at the top and at the bottom, door means selectively opening and closing said opening in the bottom of said storage bin area, and collapsable support leg means pivotally attached to said trailer means and to said wall sections such that said wall sections remain substantially vertical when said bin means is in said raised and said lowered configuration;
    conveying means for conveying asphalt to said bin means and having a raised and a lowered configuration with respect to said trailer means, said conveying means being pivotally attached to said trailer means, and to said bin means; and
    erecting means for raising or lowering said conveying means and said bin means from their lowered or raised configuration to their raised or lowered configuration, respectively;
    at least one of said wall sections of said bin means being pivotally mounted to said other wall sections so as to permit said conveying means to nest within said bin means when said conveying means and said bin means are in said lowered configuration.

2. Apparatus as in claim 1, wherein said conveying means comprises:
    drag chute means having a lower end and an upper end, said lower end being pivotally attached to said trailer means;
    drag chain means within said drag chute means for transporting asphalt from said lower end to said upper end of said drag chute means; and
    motor means for driving said drag chain means.

3. Apparatus as in claim 2, wherein said conveying means further comprises means attached to said upper end of said drag chute means for temporarily accumulating asphalt leaving the upper end of said drag chute means and then selectively discharging said accumulated material into said bin means.

4. A collapsable apparatus for storing asphalt-aggregate material comprising:
    a frame;
    bin means pivotally mounted to said frame for pivotal movement from an elevated position and to a lowered position with respect to said frame, said bin means including a generally vertical wall member a portion of which is selectively removable from the remainder of said wall member;
    conveyor means including a receiving end and a discharge end for delivering asphalt-aggregate material into said bin means, said discharge end of said conveyor means being positioned above said bin means and said conveyor means sloping downwardly over said removable portion of said wall member when said bin means is in its elevated position;
    means for pivotally raising and lowering said bin means between its elevated and lowered positions; and
    linkage means pivotally connecting said conveyor means to said bin means and to said frame so as to guide said discharge end of said conveyor means into nesting relationship within said bin means when said bin means is lowered into its lowered position.

5. A collapsable apparatus for storing asphalt-aggregate material comprising:
    a frame;
    bin means pivotally mounted to said frame for pivotal movement from an elevated position and to a lowered position with respect to said frame, said bin means including a generally vertical wall member a portion of which is selectively removable from the remainder of said wall member;
    conveyor means including a receiving end and a discharge end for delivering asphalt-aggregate material into said bin means, said discharge end of said conveyor means being positioned above said bin means and said conveyor means sloping downwardly over said removable portion of said wall member when said bin means is in its elevated position; and
    means for pivotally raising and lowering said bin means between its elevated and lowered positions and for simultaneously guiding said conveyor means into nesting relationship within said bin means when said bin means is lowered into its lowered position, all in a single uninterrupted motion.

* * * * *

REEXAMINATION CERTIFICATE (555th)
United States Patent [19]
Brock

[11] B1 4,348,146
[45] Certificate Issued Aug. 12, 1986

[54] SELF-ERECTING SURGE BIN

[75] Inventor: J. Donald Brock, Chattanooga, Tenn.

[73] Assignee: Astec Industries, Inc., Chattanooga, Tenn.

Reexamination Request:
No. 90/000,848, Aug. 29, 1985

Reexamination Certificate for:
Patent No.: 4,348,146
Issued: Sep. 7, 1982
Appl. No.: 148,509
Filed: May 9, 1980

Related U.S. Application Data

[62] Division of Ser. No. 912,501, Jun. 5, 1978, Pat. No. 4,249,351.

[51] Int. Cl.[4] .................................... B65G 67/08
[52] U.S. Cl. ................................ 414/332; 414/919
[58] Field of Search ............... 414/332, 919; 198/311; 222/160, 547; 52/64, 116, 119, 143, 192, 194, 196–198

[56] References Cited
U.S. PATENT DOCUMENTS

| | | | |
|---|---|---|---|
| 3,050,159 | 8/1962 | Paulus et al. | 52/119 X |
| 3,154,202 | 10/1964 | Heltzel | 414/332 |
| 3,934,739 | 1/1976 | Zumsteg et al. | 414/332 |

FOREIGN PATENT DOCUMENTS 930520  7/1973  Canada .

*Primary Examiner*—Robert J. Spar

[57] ABSTRACT

Self-erecting apparatus for transporting and temporarily storing material such as asphalt; the apparatus includes a surge bin and a drag chute for transporting the asphalt material from a drum plant to the surge bin. The drag chute and the surge bin are pivotally attached to each other and to a flat bed trailer, permitting their simultaneous raising and lowering by means of a winch apparatus attached by means of cables to the support legs of the surge bin to provide ease of lowering the bin for transportation of the apparatus from one site to another and ease in erecting the bin at a new site. A foldable side panel of the surge bin permits the drag chute to nest in the surge bin thus providing a more compact arrangement of the apparatus when in the lowered configuration.

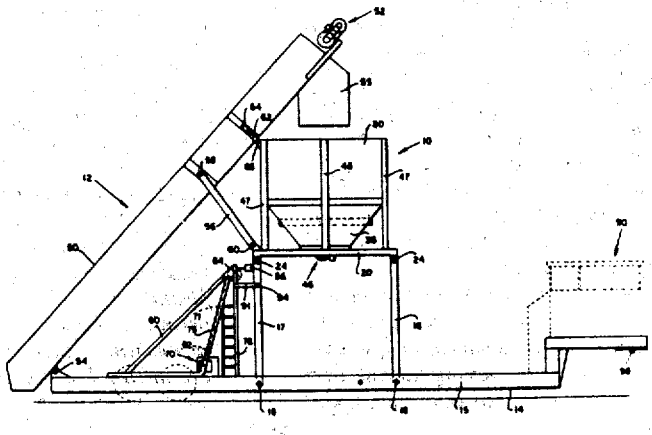

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claim 5 is confirmed.

Claims 1 and 4 are determined to be patentable as amended.

Claims 2 and 3 dependent on an amended claim, are determined to be patentable.

New claim 6 is added and determined to be patentable.

1. Apparatus for transporting and temporarily storing asphalt, said apparatus comprising:
   trailer means;
   bin means having a raised and a lowered configuration with respect to said trailer means, said bin means being pivotally attached to said trailer means and including a plurality of connected wall sections defining a storage bin area open at the top and at the bottom, door means selectively opening and closing said opening in the bottom of said storage bin area, and collapsable support leg means pivotally attached to said trailer means and to said wall sections such that said wall sections remain substantially vertical when said bin means is in said raised and said lowered configuration;
   conveying means for conveying asphalt to said bin means and having a raised and a lowered configuration with respect to said trailer means, said conveying means being pivotally attached to said trailer means, and to said bin means *at fixed points on said conveying means at all times during the raising and lowering of said bin means*; and
   erecting means for raising or lowering said conveying means and said bin means from their lowered or raised configuration to their raised or lowered configuration, respectively;
   at least one of said wall sections of said bin means being pivotally mounted to said other wall sections so as to permit said conveying means to nest within said bin means when said conveying means and said bin means are in said lowered configuration.

4. A collapsable apparatus for storing asphalt-aggregate material comprising:
   a frame;
   bin means pivotally mounted to said frame for pivotal movement from an elevated position and to a lowered position with respect to said frame, said bin means including a generally vertical wall member a portion of which is selectively removable from the remainder of said wall member;
   conveyor means including a receiving end and a discharge end for delivering asphalt-aggregate material into said bin means, said discharge end of said conveyor means being positioned above said bin means and said conveyor means sloping downwardly over said removable portion of said wall member when said bin means is in its elevated position;
   means for pivotally raising and lowering said bin means between its elevated and lowered positions; and
   linkage means pivotally connecting said conveyor means to said bin means and to said frame *at all times during the raising and lowering of said bin means* so as to guide said discharge end of said conveyor means into nesting relationship within said bin means when said bin means is lowered into its lowered position.

*6. Apparatus for transporting and temporarily storing asphalt, said apparatus comprising:*
   *trailer means;*
   *bin means having a raised and a lowered configuration with respect to said trailer means, said bin means being pivotally attached to said trailer means and including a plurality of connected wall sections defining a storage bin area open at the top and at the bottom, door means selectively opening and closing said opening in the bottom of said storage bin area, and collapsable support leg means pivotally attached to said trailer means and to said wall sections such that said wall sections remain substantially vertical when said bin means is in said raised and said lowered configuration;*
   *conveying means for conveying asphalt to said bin means and having a raised and a lowered configuration with respect to said trailer means;*
   *linkage means pivotally attaching said conveying means to said trailer means and to said bin means at fixed points on said conveying means at all times during the raising and lowering of said bin means; and*
   *erecting means for raising or lowering said conveying means and said bin means from their lowered or raised configuration to their raised or lowered configuration, respectively;*
   *at least one of said wall sections of said bin means being pivotally mounted to said other wall sections so as to permit said conveying means to nest within said bin means when said conveying means and said bin means are in said lowered configuration.*

* * * * *